United States Patent
Allen

(10) Patent No.: US 10,745,183 B2
(45) Date of Patent: Aug. 18, 2020

(54) AXLE GUARD FOR PACKAGING A BICYCLE

(71) Applicant: Huffy Corporation, Miamisburg, OH (US)

(72) Inventor: Kirk T. Allen, Miamisburg, OH (US)

(73) Assignee: Huffy Corporation, Miamisburg, OH (US)

( * ) Notice: Subject to any disclaimer, the term of this patent is extended or adjusted under 35 U.S.C. 154(b) by 90 days.

(21) Appl. No.: 15/891,418

(22) Filed: Feb. 8, 2018

(65) Prior Publication Data

US 2018/0251285 A1    Sep. 6, 2018

Related U.S. Application Data

(60) Provisional application No. 62/466,001, filed on Mar. 2, 2017.

(51) Int. Cl.
| | | |
|---|---|---|
| *B65D 81/05* | (2006.01) | |
| *B60B 7/06* | (2006.01) | |
| *B65D 85/68* | (2006.01) | |

(52) U.S. Cl.
CPC ............ *B65D 81/053* (2013.01); *B60B 7/068* (2013.01); *B65D 85/68* (2013.01); *B65D 2585/6862* (2013.01)

(58) Field of Classification Search
CPC ......... B60B 7/00; B60B 7/006; B60B 7/0013; B60B 7/06; B60B 7/066; B60B 7/068; B65D 81/053
See application file for complete search history.

(56) References Cited

U.S. PATENT DOCUMENTS

| | | | |
|---|---|---|---|
| 2,151,485 A | 3/1939 | Pawsat | |
| D121,717 S | 7/1940 | Herold | |
| D157,822 S | 3/1950 | Wolfe | |
| 2,837,376 A * | 6/1958 | Bruno | A63C 17/22 |
| | | | 301/5.301 |
| 3,924,898 A | 12/1975 | Kain | |
| 4,962,968 A * | 10/1990 | Caplin | B60B 7/00 |
| | | | 301/108.5 |
| 5,249,845 A * | 10/1993 | Dubost | B60B 7/068 |
| | | | 301/108.4 |
| D418,472 S | 1/2000 | Okamoto et al. | |
| 6,485,044 B1 * | 11/2002 | Blake | B60B 27/0005 |
| | | | 280/288.4 |
| D476,925 S | 7/2003 | Bethlenfalvy | |
| 6,860,692 B2 * | 3/2005 | Van Ingen | F16B 37/14 |
| | | | 411/377 |
| 7,182,410 B2 * | 2/2007 | Fukui | B60B 7/00 |
| | | | 301/108.5 |

* cited by examiner

*Primary Examiner* — Jason R Bellinger
(74) *Attorney, Agent, or Firm* — Wood Herron & Evans LLP

(57) ABSTRACT

A method of packaging a bicycle having at least one wheel axle with exposed ends in a shipping carton. The method includes attaching a guard over at least one of the exposed ends of the axle by sliding the axle through a slotted opening in the guard and using the guard to tighten a fastener to positively secure the guard on the axle. A distal surface of the guard is aligned with a side of the carton and the bicycle is placed into the carton with the distal guard surface adjacent to a side of the carton.

21 Claims, 11 Drawing Sheets

AXLE GUARD FOR PACKAGING A BICYCLE

CROSS REFERENCE TO RELATED APPLICATIONS

This application claims the benefit of U.S. Provisional Application Ser. No. 62/466,001, filed Mar. 2, 2017, the disclosure of which is incorporated by reference herein in its entirety.

TECHNICAL FIELD

This application generally relates to packaging materials for bicycles, and more particularly to an improved axle guard for use in packaging and shipping a bicycle.

BACKGROUND

Recently, the number of bicycles being shipped directly from a warehouse to a consumer through on-line purchases has been increasing. Typically, bicycles are shipped to consumers in standard corrugated cardboard cartons. FIG. 1 depicts an exemplary bicycle 20 packaged for shipping in a conventional carton 22. During the warehousing and shipping process, it is not uncommon for the shipping carton 22 to be subjected to a number of forces acting on the carton, as depicted by the arrows 24. These forces can cause exposed ends of the front wheel axle 26, rear wheel axle 30, or both axles of the bicycle 20 to rip and/or poke through the carton 22 as indicated at 32 and 34. Once an axle pokes a hole in the carton, typically the hole will continue to expand during the shipping process. The portion of the axle that protrudes through the carton represents a concern for consumers and warehousing personnel. In regard to the former, the exposed axle end can hit or scrape the arms or legs of the consumer potentially causing injury. In regard to the latter, the exposed axle end can catch on conveyor systems used to move goods around the shipping warehouse. The exposed axle can get caught on equipment and be a safety risk. Therefore, it is undesirable to have the axle poke through the carton in which the bicycle is packaged.

One known solution to this problem is to use an axle guard to shield the exposed ends of the axles during shipment. Traditional axle guards are intended to slide on to the axle or the axle nuts that hold the wheels to the frame and be held thereon by a simple friction fit. However, the slide on design of the existing guards does not function very well, easily falling off during insertion of the bicycle into the carton or movement of the shipping carton due to the loose friction fit of the guard on the axle or axle nut. When the protective guard falls off the axle, the exposed end of the axle often protrudes through the cardboard carton, causing damage to the carton and potentially giving rise to the other problems described above.

Accordingly, it is desirable to have an apparatus and method for shipping bicycles in cardboard cartons that eliminates the problem of the axle poking through the side of the carton. In particular, it is desirable to have an improved axle guard which is securely attached onto the wheel axle to prevent the guard from falling off the axle during movement of the shipping carton. Further, it is desirable to have an axle guard which can be easily and securely applied to a conventional bicycle axle, prior to placing the bicycle in a shipping carton, without the need to remove the axle nut from the axle.

SUMMARY

The improved axle guard and method of using the same described herein uses a positive connection between the axle and guard to hold the guard on the axle. The axle guard is secured onto the axle using the nut that secures the wheel to the bike. The axle guard is secured between the axle nut and wheel, rather than being held only on the end of the axle nut. Securing the guard between the axle nut and wheel prevents the axle guard from becoming dislodged from the axle during movements of the shipping carton.

In a first embodiment, an axle guard is provided for use in shipping a bicycle. The axle guard includes a shield portion having proximal and distal surfaces, and a cap projecting from the proximal surface. The cap includes a slotted opening for engaging the wheel axle. An axle fastener is moveable by the guard to positively secure the cap to the axle, when the axle is positioned in the slotted opening.

In a second embodiment, a combination for protecting a carton enclosing a bicycle during shipping is provided. The combination includes a carton sized for holding a bicycle, a bicycle having a wheel with at least one exposed axle end and a fastener configured for connection to the exposed axle end, and a guard. The guard includes a slotted opening for engaging the axle. The fastener positively secures the guard to the axle when the axle is positioned in the slotted opening. The distal surface of the guard extends between the exposed axle end and a side of the carton when the guard is mounted on the axle.

In a third embodiment, a method of packaging a bicycle in a shipping carton is provided. The method includes attaching a guard over at least one exposed end of the bicycle axle by sliding the axle through a slotted opening in the guard. The guard is then used to tighten a fastener and positively secure the guard on the axle. After one or more guards are attached to the bicycle, the distal surface of the guard is aligned with a side of the carton, and the bicycle is placed into the carton with the one or more guard surfaces adjacent to the inner surfaces of the carton.

BRIEF DESCRIPTION OF THE DRAWINGS

The present disclosure will be more readily understood from a detailed description of some example embodiments taken in conjunction with the following figures.

DETAILED DESCRIPTION

Various non-limiting embodiments of the present disclosure will now be described to provide an overall understanding of the principles of the structure, function, and use of the apparatus disclosed herein. One or more examples of these non-limiting embodiments are illustrated in the accompanying drawings. Those of ordinary skill in the art will understand that the apparatus described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Figure 1:
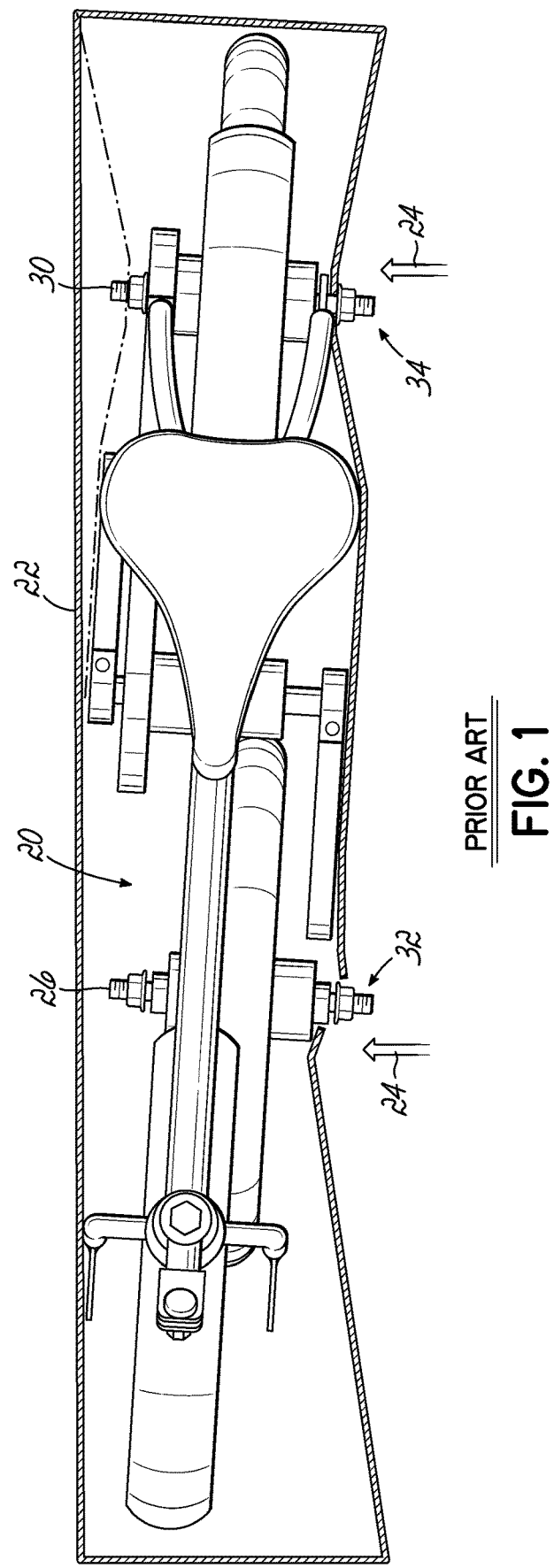
FIG. 1 is a schematic top view of a prior art arrangement of a bicycle in a shipping carton showing the carton being punctured by front and rear wheel axles.
Figure 2:
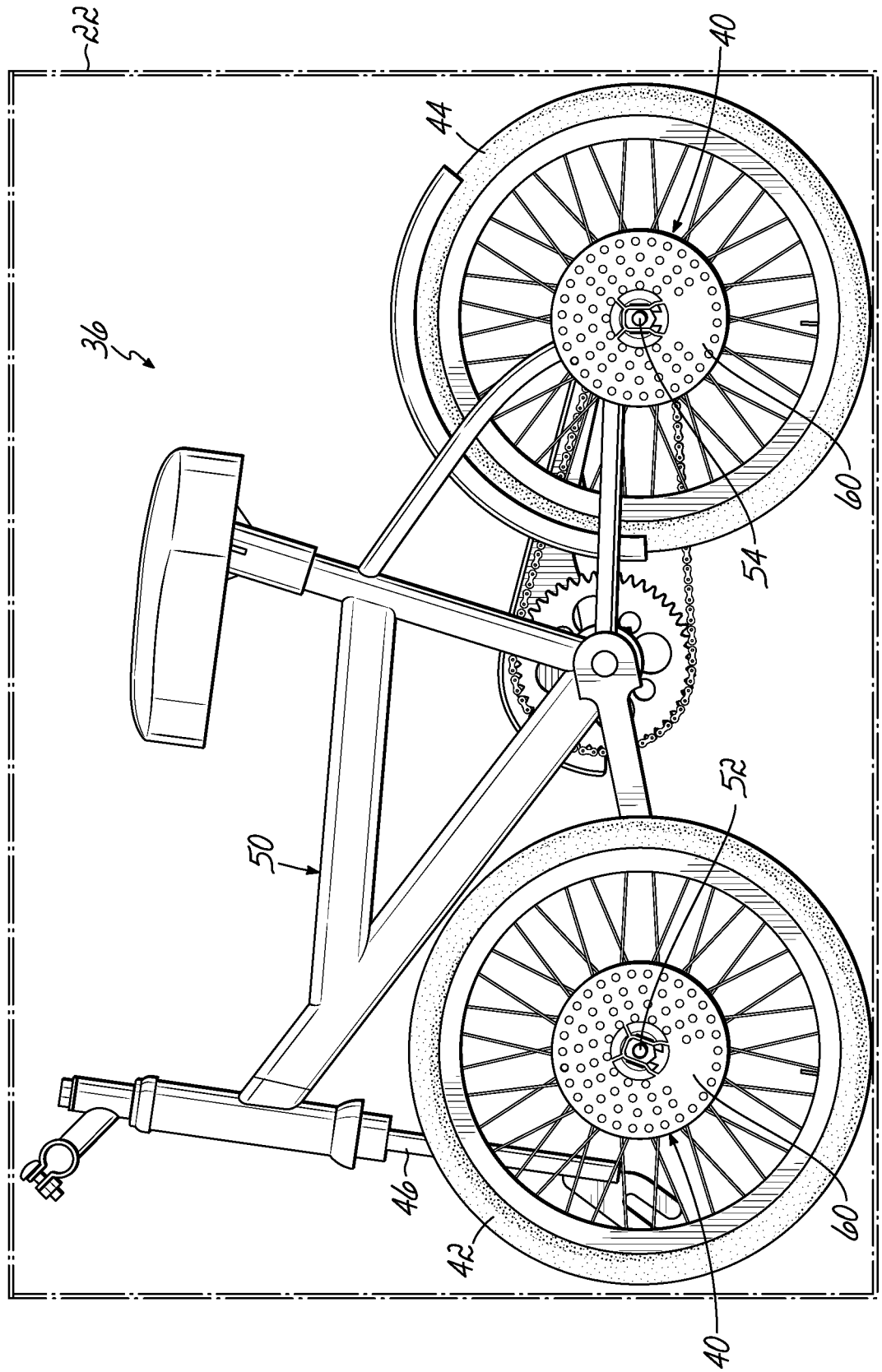
FIG. 2 is a schematic side view of a bicycle with axle guards attached to the front and rear wheels.

Turning now to the drawing figures, wherein like numbers indicate like features throughout the views, FIG. 2 illustrates a bicycle 36 with an exemplary embodiment of protective guards 40 attached to the front and rear wheels 42, 44 to cover the exposed ends of the wheel axles. In the figure, the bicycle 36 is shown in a shipping carton 22. The front wheel 42, with wheel axle 52, is shown detached from the fork 46 of the bicycle frame 50. The rear wheel 44 is shown attached to the bike frame 50 by rear wheel axle 54. Different types of attachment mechanisms or fasteners may be used for attaching the wheel axles 52, 54 to the frame 50. In the exemplary embodiments described herein, flange nuts 56 are used for attaching the wheels 42, 44 to the frame 50. The opposing ends of each of the wheel axles 52, 54 are threaded, and a mating flange nut 56 is secured onto the axle end. Flange nuts 56 include a hexagonal portion 57 and an end flange 58 (shown in FIG. 5A), which engage guard 40 when the guard is mounted on the wheel axle, as will be described in more detail below. FIG. 2 depicts guards 40 attached to each of the bicycle wheels 42, 44. As will be described herein, a guard 40 may be connected to the front wheel 42, rear wheel 44, or both wheels, prior to packaging the bicycle for shipment. A guard 40 may be attached to both ends of a wheel axle, or to only one end of an axle. The guards 40 may be connected to the wheel axles 52, 54 after the wheels have been attached to the bicycle frame 50. However, typically a bicycle will be shipped with the front wheel detached from the frame to reduce the overall carton size. Accordingly, a guard 40 may also be attached to a wheel without the wheel being connected to the bicycle frame.

Figure 4:
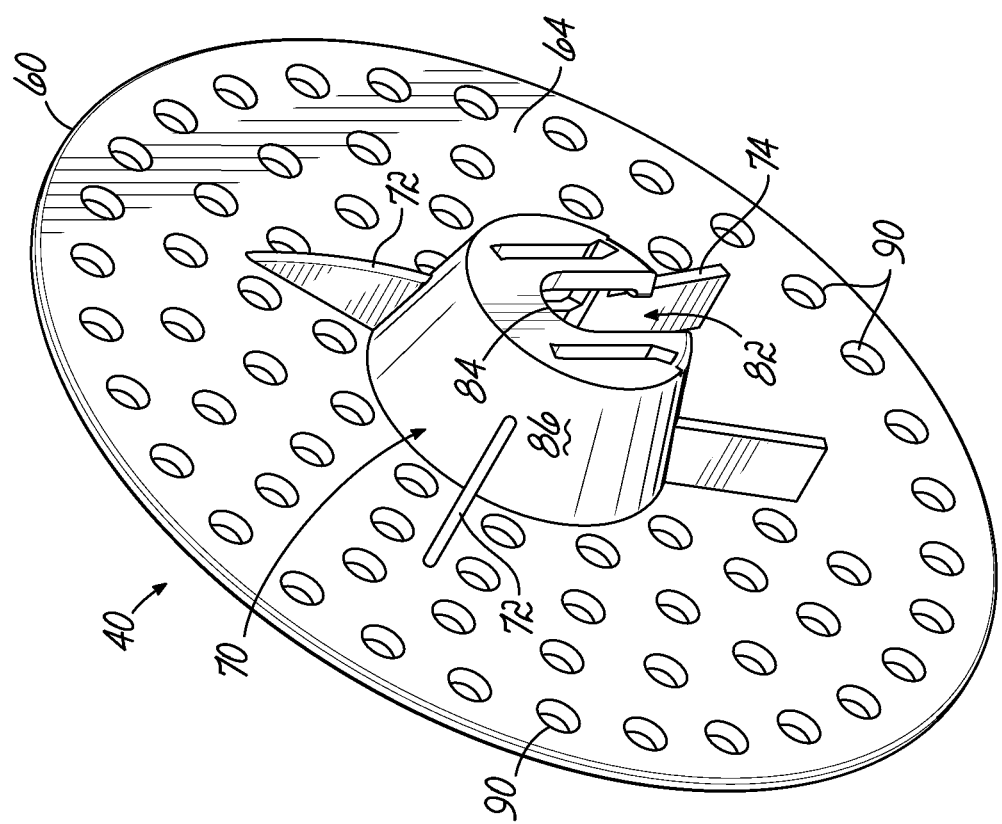
FIG. 4 is a perspective view showing a proximal side of an exemplary axle guard.
Figure 3:
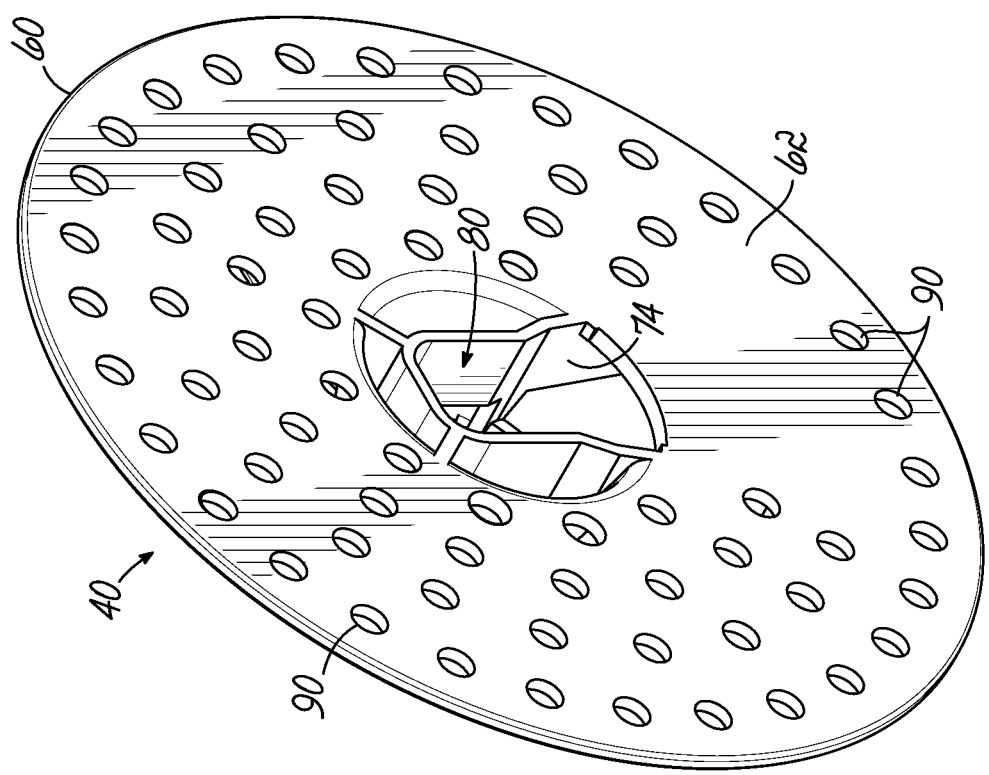
FIG. 3 is a perspective view showing a distal side of an exemplary axle guard.

As shown in greater detail in FIGS. 3 and 4, guard 40 includes a disk-shaped shield portion 60 having a distal side 62 and a proximal side 64. Distal side 62 of shield 60 will face outward, away from the wheel, when mounted on an axle, and will typically have a planar surface as shown. However, non-planar surfaces are also possible on distal side 62, provided the surface shields the end of the axle and includes a smooth surface for contacting the shipping carton. Guard 40 also includes a cap portion 70 projecting from the proximal side 64 of shield 60. Cap 70 is shown with a substantially circular top and tapered side walls 86 extending between the top and the proximal surface of shield 60. However, cap 70 may have other, non-circular shapes, with or without tapered sidewalls, without altering the functioning of guard 40. One or more support members 72 are circumferentially spaced about the perimeter of cap 70. Support members 72 are connected between cap 70 and the proximal side 64 of shield 60 to strengthen the connection between the cap and shield.

Figure 5A:
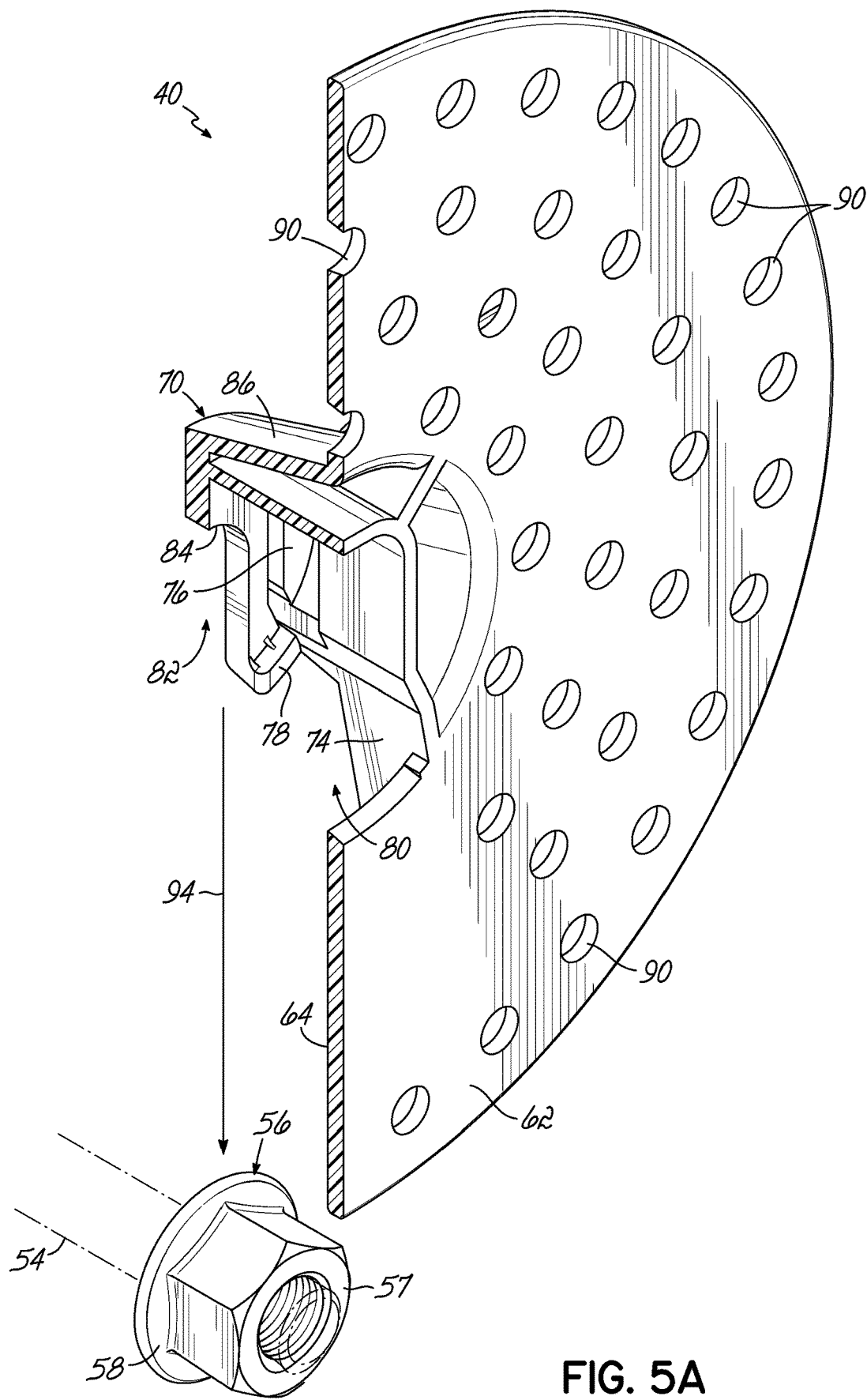
FIG. 5A is a perspective, vertical sectional view of the axle guard with a flange nut and an axle (shown in phantom)
Figure 5B:
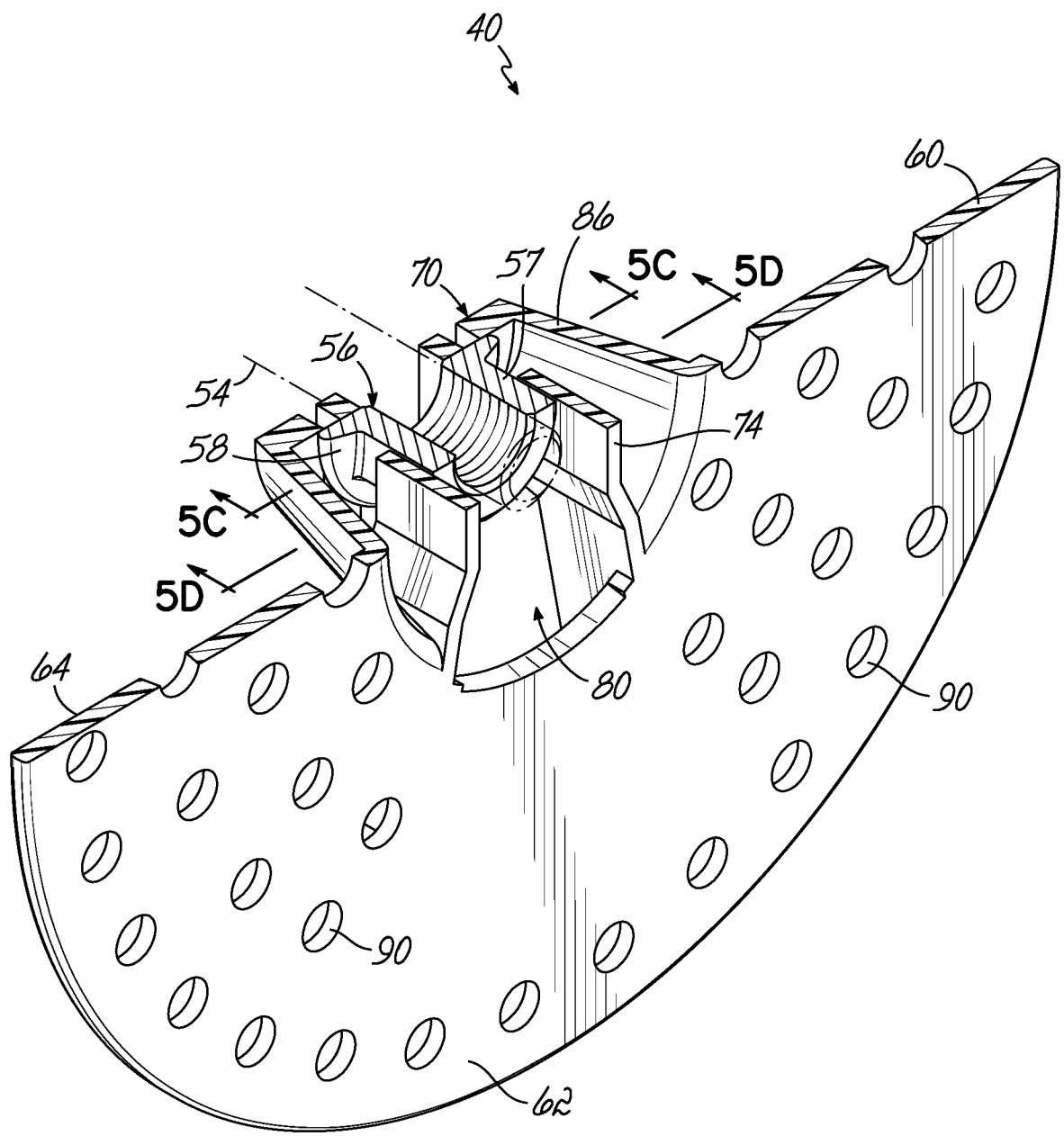
FIG. 5B is a perspective, horizontal sectional view of the axle guard with a flange nut and an axle (shown in phantom)
Figure 5C:
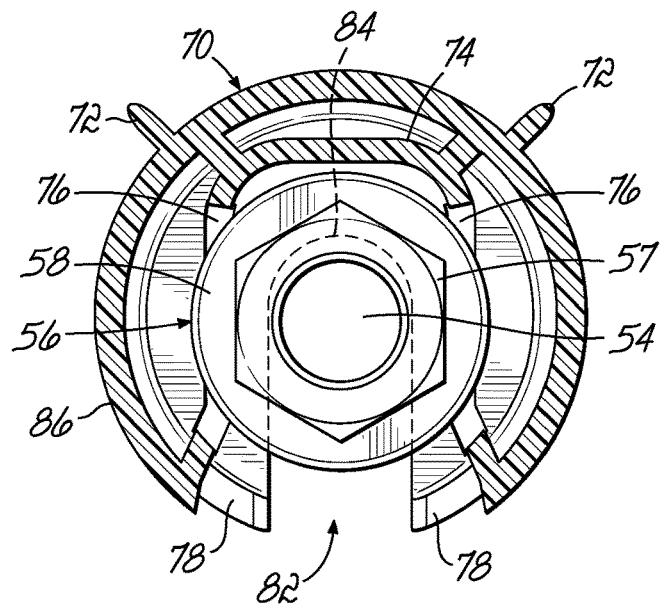
FIG. 5C is a cross-sectional view taken along line 5C-5C of FIG. 5B.
Figure 5D:
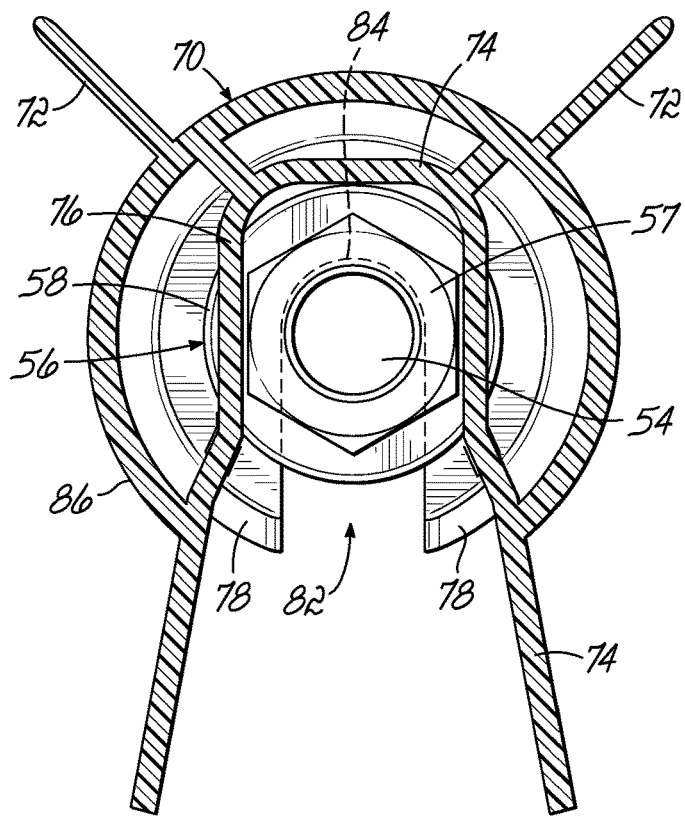
FIG. 5D is a cross-sectional view taken along line 5D-5D of FIG. 5B.

As shown in FIGS. 5A and 5B, an opening 80 extends through the side of cap 70. The opening 80 is aligned with an aperture 82 in the top of cap 70 to form a slotted opening for insertion of a wheel axle. Aperture 82 includes a distal, closed end 84, and has a width slightly greater than the diameter of the wheel axle on which the guard 40 is to be mounted. The side wall 86 of cap 70 has a length at least equal to the length of the exposed end of the axle 54 and axle nut 56, so that the exposed axle end and nut are enclosed within the cap when the guard 40 is mounted on the axle. A wall 74 is connected to the inner surface of cap 70. Wall 74 also extends outside of cap 70, through opening 80, as shown in FIG. 5D. The extension of wall 74 outside cap 70 provides additional support for strengthening shield 60 and facilitates the sliding of axle 54 through opening 80. Slots 76 are formed in opposite sides of wall 74 within cap 70, and sized to accommodate opposing edges of flange nut 56, as shown in FIGS. 5B and 5C. In addition, detents 78 extend from the inner top surface of cap 70 at the open end of aperture 82. Detents 78 can engage the flange end 58 of nut 56 to prevent the nut from sliding out of the guard opening 80. Guard 40 can have a solid configuration, or may include a plurality of holes 90 as shown in the figures. While guard 40 is shown with a circular configuration in the illustrated embodiment, the guard may comprise alternative shapes provided the overall configuration of the guard provides an outward facing surface without sharp or pointed edges. Guard 40 may be manufactured from plastic, metal, or similar types of materials having sufficient strength to prevent the exposed end of an axle from penetrating through or breaking the guard when subjected to forces during the shipping process.

Figure 6:
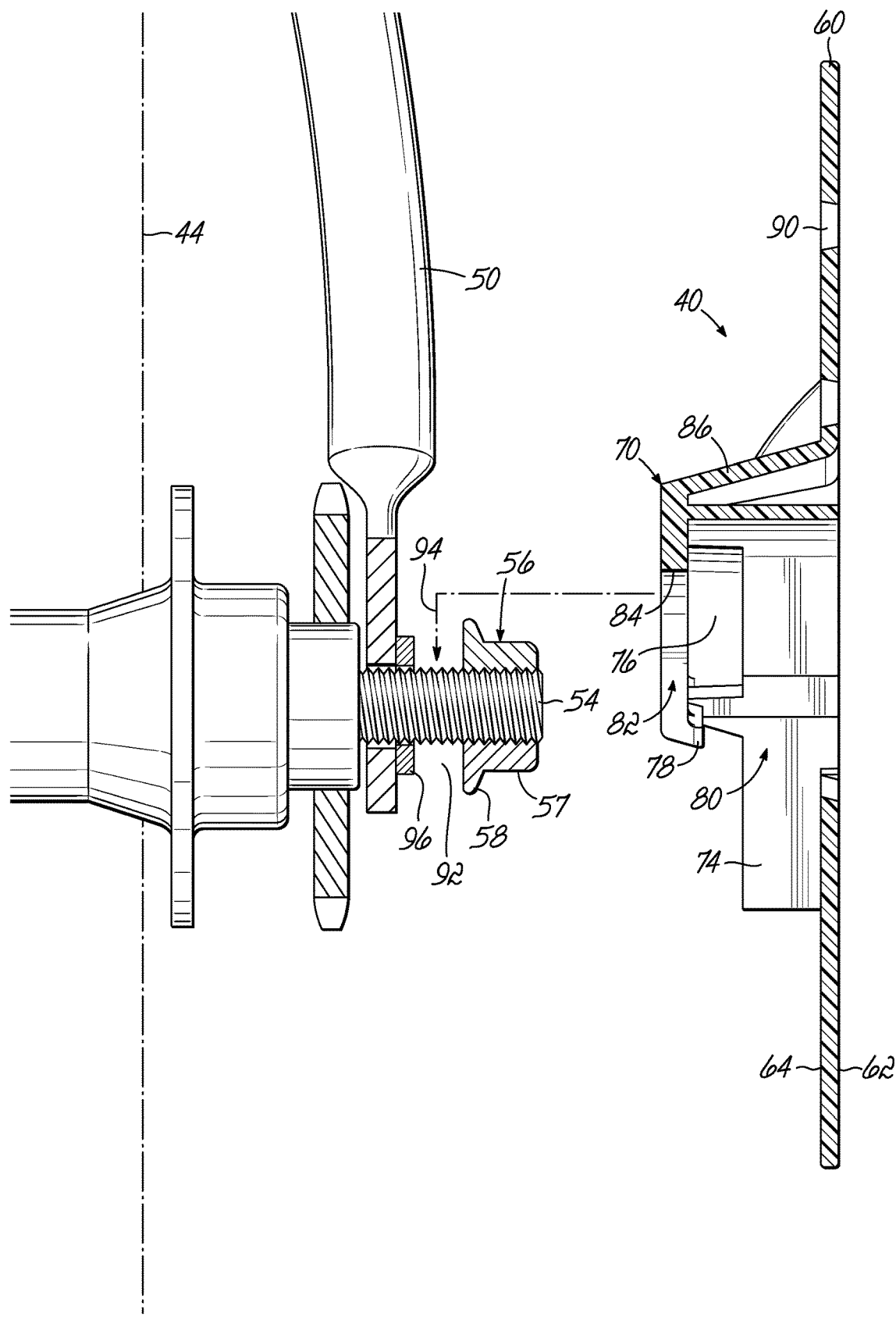
FIG. 6 is a side view partially in section showing a rear wheel axle and axle guard, with the guard aligned for attachment to the axle.

As shown in FIG. 6, a guard 40 can be attached to an exposed end of a wheel axle 52, 54 by aligning the planar surfaces of shield 60 perpendicular to the wheel axle, with the proximal side 64 and cap 70 orientated towards the wheel (shown in phantom). Guard 40 is shown being attached to a rear wheel axle 54 in FIG. 6. However, a similar attachment process may be followed for attaching a guard 40 to a front wheel axle 52. To attach guard 40, the guard is slid down over the axle nut 56 on the exposed end of the axle. The nut 56 may be loosely held on the axle in order to produce a gap 92 for insertion of the guard 40. Alternatively, a guard 40 may be connected to an axle nut 56 before the nut is threaded onto the axle end. Guard 40 is positioned on the axle 54 by inserting the axle end through opening 80, and sliding the guard down along the axle, in the direction indicated by arrow 94, until the axle is lodged at the upper end of the aperture 82. As the axle 54 moves through aperture 82, opposing edges of the flange nut 56 engage the sides of wall 74, slightly flexing the walls to enable the nut to pass. As axle 54 reaches the upper end of aperture 82, opposing edges of end flange 58 pass into the slots 76 in wall 74. As guard 40 slides down onto the axle 54, the lower edge of flange nut 56 slides past detents 78.

Figure 7:
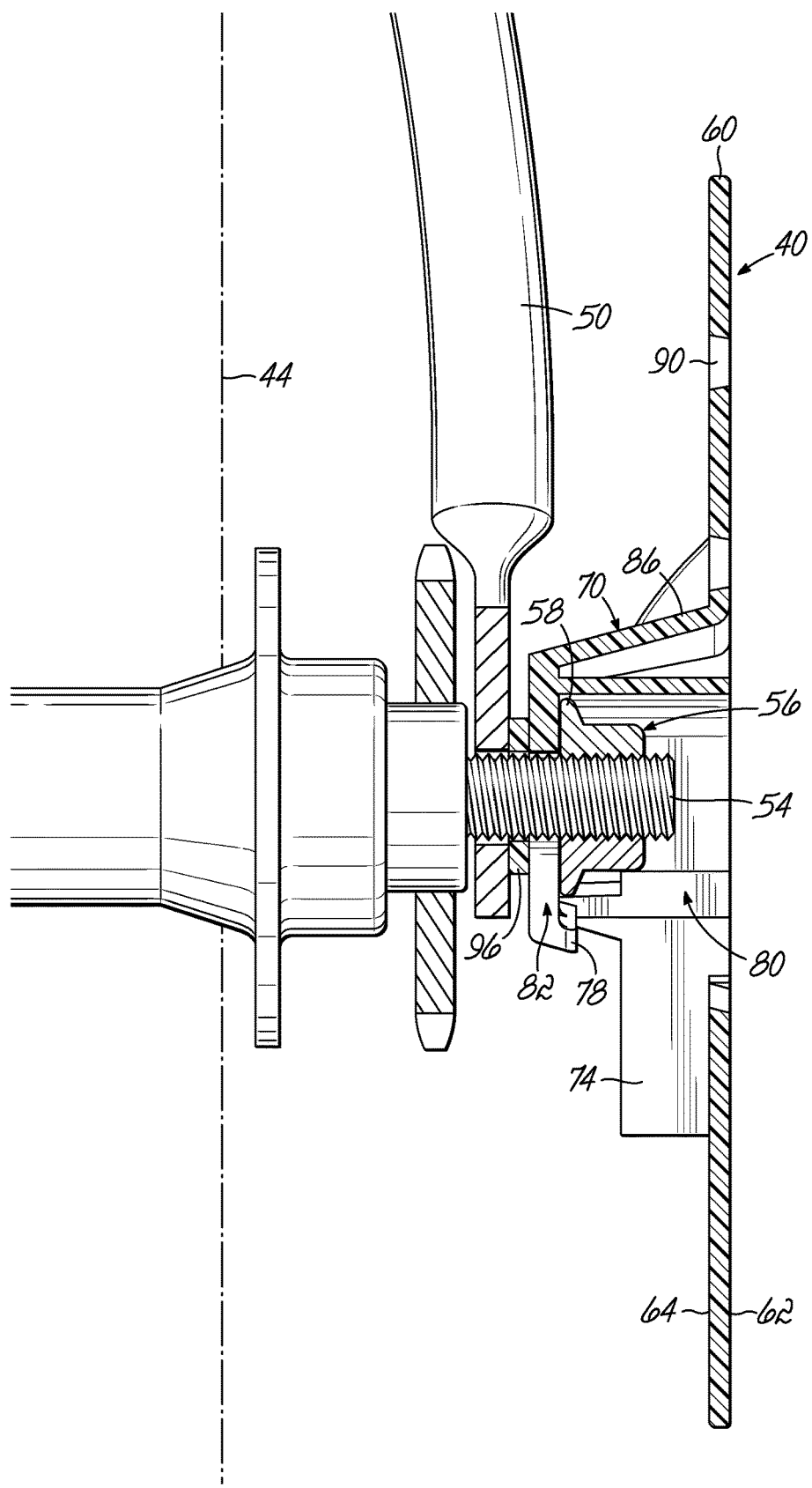
FIG. 7 is a side view partially in section showing a rear wheel axle and axle guard, with the axle guard securely attached to the axle.

Cap 70 and inner wall 74 may be composed of a material, such as plastic, which is substantially rigid yet able to flex slightly under pressure, as the guard 40 is slid over the nut 56, in order to allow the nut to be inserted inside cap 70. When nut 56 is fully inserted into guard 40, opposing edges of the end flange 58 are locked inside slots 76. Also when mounted inside guard 40, parallel sides of nut 56 engage opposing inner surfaces of wall 74, as shown in FIG. 5D. With nut 56 affixed to cap wall 74, shield 60 can be rotated to cause the cap to twist the nut on axle 54. The turning of shield 60 tightens nut 56 on the threaded end of axle 54 to positively secure guard 40 on the axle end. Guard 40 may be rotated to tighten nut 56 until the guard is pushed back proximally against the wheel hub (or frame 50 as shown in FIG. 7), and clamped between the nut and frame.

Figure 8:
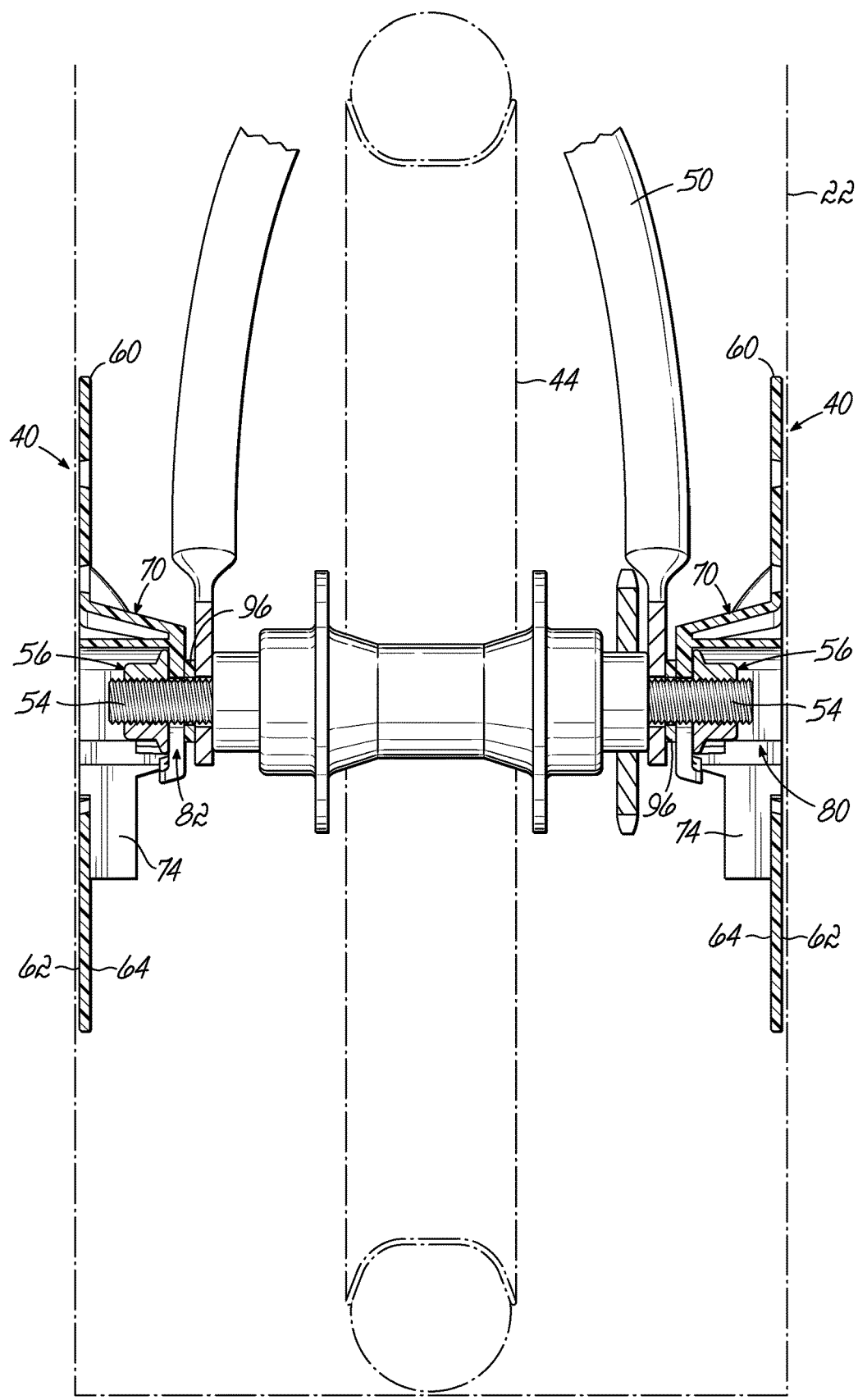
FIG. 8 is a side view partially in section showing a pair of axle guards attached over opposite exposed ends of a rear wheel axle inside a shipping carton.

When guard 40 is mounted on the axle 54, the exposed axle end and fastener 56 will be located inside cap 70. Guard 40 will be held on the axle 54 by nut 56 on the distal side of the bicycle frame. As shown in FIGS. 6 and 7, a washer 96 may be located on the threaded end of axle 54 so that the top of cap 70 contacts the washer when guard 40 is mounted on the axle. In addition to using the guard 40 to tighten the axle nut 56, it is envisioned that a nut may be attached to the axle 54 prior to the attachment of guard 40, and tightened to the point of leaving a gap 92 just wide enough to accommodate the thickness of the cap top. In this embodiment, cap 70 is slid down into the gap 92, thereby eliminating the need to further tighten the nut after the guard is mounted on the axle. As shown in FIG. 8, a second guard 40 may be similarly attached to the opposite exposed end of the bicycle axle 54, following the steps described above, in order to cover both ends of the axle.

Figure 9:
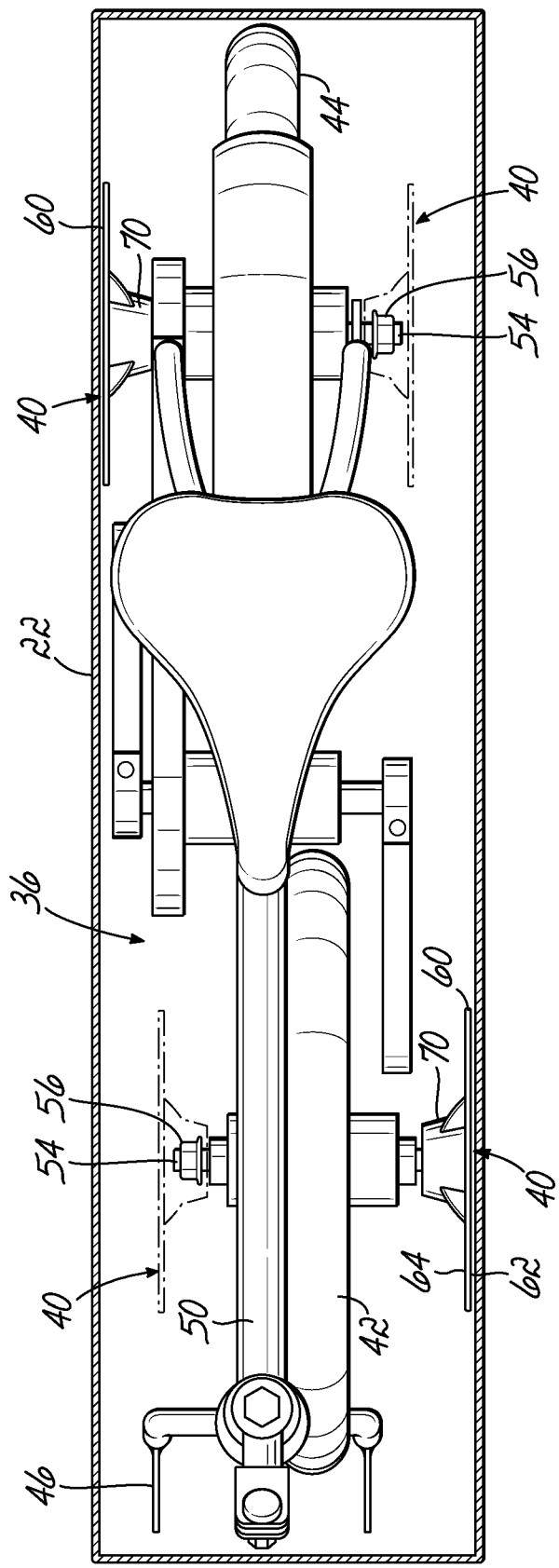
FIG. 9 is a top schematic view showing a bicycle, having axle guards attached to the front and rear wheel axles, placed in a shipping carton, with the front wheel disassembled from the bicycle frame.
Figure 10:
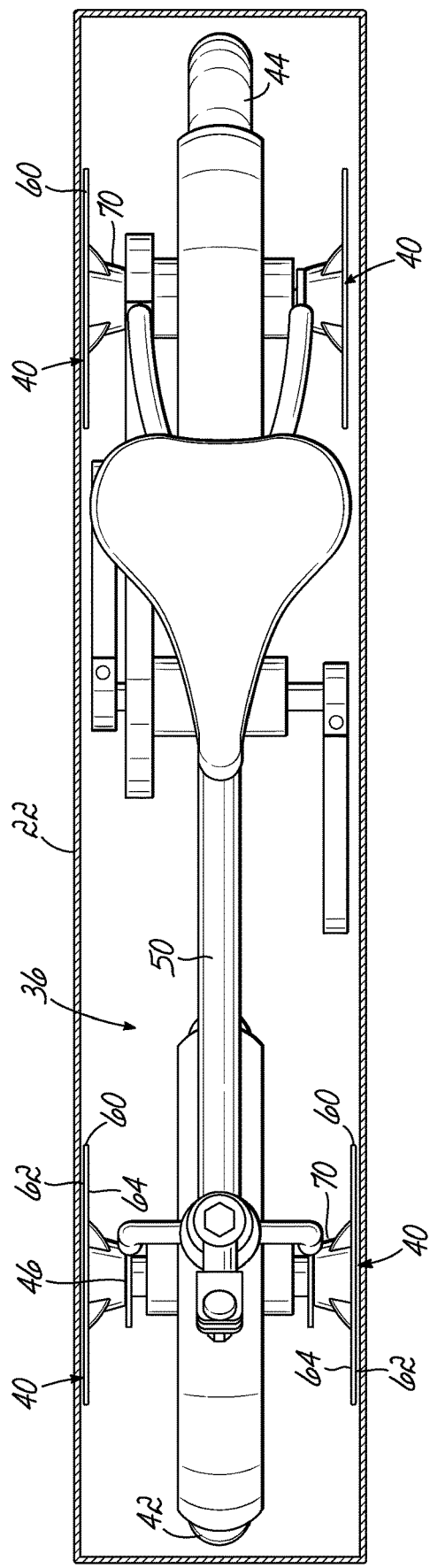
FIG. 10 is a top schematic view showing a bicycle, with axle guards attached to the front and rear wheel axles, placed in a shipping carton.

Bicycles are typically packaged in cartons having a length and width substantially the same as the length and width of the bicycle, in order to conserve packaging material and save on shipping costs. The bicycles are packed either with the front wheel attached or with the front wheel detached. FIG. 9 illustrates a first shipping configuration, in which the front wheel 42 is disassembled from the bicycle frame 50 in order to reduce the length of the shipping carton 22. FIG. 10 illustrates a second shipping configuration in which the front wheel 42 is attached to the bicycle frame 50 in the carton 22. To pack a bicycle into a shipping carton, a protective guard 40 is attached to one or more of the exposed ends of the bicycle axles 52, 54 by sliding the slotted opening of the guard down over the wheel axle, and rotating the guard to positively secure the guard to the axle using the axle nut 56. The bicycle 36 is then placed into a carton 22 with the longitudinal length of the bicycle aligned with the longitudinal axis of the carton. This alignment within the carton may vary slightly when the front wheel is disassembled, as shown in FIG. 9.

When the bicycle 36 is placed in the carton 22, the distal shield surface 62 of each guard 40 is aligned substantially parallel with a side of the carton. The planar nature of the shield surface 62 enables the guard to contact the sides of the carton 22 without penetrating the carton. The exposed end of the axle is enclosed within the cap 70, preventing the axle end from contacting the inside of the carton.

The apparatus described herein provides an improved axle guard that can be slid over a wheel axle, and then subsequently used to tighten the existing axle nut to clamp the guard between the wheel hub and the axle nut. The positive connection between the wheel hub, guard, and axle nut eliminates the simple friction fit of prior axle guard designs, and provides improved retention of the guard on the axle during movement of the shipping carton. Once the bicycle has reached its destination, the axle guard can be rotated to loosen the axle nut, allowing the guard to be lifted off of the axle. After the guard is removed, the axle nut may be tightened back against the wheel hub using a conventional tool prior to use of the bicycle.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A protective guard for use in shipping a bicycle having at least one wheel with an axle for attaching the wheel to a frame, the protective guard comprising:
   a shield portion having a proximal surface and a distal surface;
   a cap projecting from the proximal surface of the shield portion, the cap including a slotted opening slidable over the axle in a lateral direction and a locking wall; and
   a fastener configured to be attached to an end of the axle, wherein the locking wall is configured to engage the fastener when the slotted opening slides over the axle in the lateral direction, and wherein the locking wall is configured to cause the fastener to move with the cap to positively secure the protective guard on the axle.

2. The protective guard of claim 1, wherein the distal surface of the shield is configured to extend axially beyond the axle when the protective guard is positively secured to the axle.

3. The protective guard of claim 1, wherein the cap is mountable on the axle between the fastener and a wheel hub.

4. The protective guard of claim 3, wherein the cap is clamped between the fastener and wheel hub when the protective guard is positively secured to the axle.

5. The protective guard of claim 1, wherein the cap is configured to tighten or loosen the fastener when the shield is rotated.

6. The protective guard of claim 1, wherein the locking wall is configured to cause the fastener to rotate with the cap to tighten the fastener on the axle.

7. The protective guard of claim 6, wherein the locking wall is inside the cap and the cap is configured to enclose the axle end and fastener when the locking wall engages the fastener.

8. A combination for protecting a carton enclosing the bicycle during shipment, the combination comprising:
   the carton;
   the bicycle disposed in the carton, wherein the axle of the at least one wheel includes at least one exposed end; and
   the protective guard of claim 1 mounted on the at least one exposed end of the axle by the fastener wherein the distal surface of the protective guard extends between the at least one exposed end and a side of the carton when the protective guard is mounted on the axle.

9. The combination of claim 8, wherein the distal surface of the protective guard is planar.

10. The combination of claim 9, wherein the planar distal surface extends perpendicular to an axis of the axle.

11. The combination of claim 8, wherein the protective guard is clamped between the fastener and a hub of the wheel.

12. The combination of claim 8, wherein the at least one wheel has two exposed axle ends and the protective guard is mounted on each of the two axle ends.

13. The combination of claim 8, wherein the protective guard includes the cap having an inner area, and the fastener and the at least one exposed end of the axle are located within the inner area of the cap when the protective guard is positively secured to the axle.

14. A method of packaging in a shipping carton the bicycle having the at least one wheel with a hub and the axle with exposed ends, the method comprising:
   attaching the protective guard of claim 1 over at least one of the exposed ends of the axle by sliding the axle through the slotted opening in the protective guard;
   using the protective guard to tighten the fastener to positively secure the protective guard on the axle;
   aligning the distal surface of the protective guard with a side of the carton; and
   placing the bicycle into the carton with the distal surface of the protective guard adjacent to an inner surface of the carton.

15. The method of claim 14, wherein the step of attaching the protective guard to the axle end further comprises sliding the axle through the slotted opening until the axle reaches an end of the opening.

16. The method of claim 14, further comprising the step of inserting the axle through the slotted opening in the cap until the axle reaches an end of the opening.

17. The method of claim 14, wherein the attaching step further comprises sliding the protective guard over the fastener and locking the fastener inside the protective guard.

18. The method of claim 14, wherein the step of using the protective guard to tighten the fastener further comprises rotating the protective guard to move the fastener closer to the wheel hub.

19. The method of claim 14, wherein the step of positively securing the protective guard on the axle further comprises using the protective guard to rotate the fastener in the direction of the wheel hub to clamp the protective guard to the axle.

20. The protective guard of claim 1, wherein the cap further includes an annular side wall extending between the proximal surface of the shield and the top of the cap, the side wall having an opening in the lateral direction forming a portion of the slotted opening.

21. The protective guard of claim 20, wherein the opening has a width greater than a diameter of the axle.

* * * * *